United States Patent [19]
Wilson et al.

[11] Patent Number: 5,857,774
[45] Date of Patent: Jan. 12, 1999

[54] CHURNING SYSTEM FOR A VEHICLE

[76] Inventors: Lorean L. Wilson; Larry B. Wilson; Delinda K. Wilson, all of 1819 Valcourt, Richardson, Tex. 75081

[21] Appl. No.: 948,906

[22] Filed: Oct. 10, 1997

[51] Int. Cl.[6] .............................. B01F 9/00; B62K 27/10
[52] U.S. Cl. ...................... 366/149; 366/233; 280/288.4
[58] Field of Search ................................... 366/144, 149, 366/219, 218, 233, 208, 232; 62/340, 345, 346, 342; 99/466, 348; 280/288.4

[56] References Cited

U.S. PATENT DOCUMENTS

| | | | | |
|---|---|---|---|---|
| 66,559 | 7/1867 | Burt | .......................................... | 366/233 |
| 655,387 | 8/1900 | Anderson | ................................. | 366/149 |
| 1,409,827 | 3/1922 | Callahan | ............................... | 366/162.1 |
| 4,078,263 | 3/1978 | Campbell | ................................. | 366/233 |
| 4,669,274 | 6/1987 | Huang | ..................................... | 366/233 |

*Primary Examiner*—Tony G. Soohoo
*Attorney, Agent, or Firm*—Baker & Botts, L.L.P.

[57] ABSTRACT

The invention comprises a churning system for a vehicle that substantially freeze an edible mixture. In accordance with one embodiment of the present invention, a churning system (20) may comprise a rotating assembly (26) and a bracket (24). The rotating assembly (26) may include an outer container (88) and an inner container (90) with a cooling cavity (92) disposed between the inner container (90) and the outer container (88). The outer container (88) may include an outer receptacle (94) having an opening (98) and an outer receptacle lid (96) sized to fit the opening (98). The inner container (90) may include an inner receptacle (100) having an opening (104) and an inner receptacle lid (102) sized to fit the opening (104). The cooling cavity (92) operates to contain a cooling media (110) for cooling an edible mixture (108) contained inside of the inner container (90).

20 Claims, 3 Drawing Sheets

CHURNING SYSTEM FOR A VEHICLE

TECHNICAL FIELD OF THE INVENTION

This invention relates in general to the field of food preparation devices and more particularly to a churning system for a vehicle, such as a bicycle, that may be used to produce an edible mixture, such as ice cream.

BACKGROUND OF THE INVENTION

Chilled and frozen foods are often prepared using a churning system that mixes the food while the food is being chilled or frozen. One such food often produced by a churning system is ice cream. Ice cream is typically produced by freezing an ice cream mixture in an ice cream maker.

Churning systems used to make ice cream are typically vertically oriented systems. For example, a common ice cream maker typically utilizes a vertically mounted cylindrical container that contains an ice cream mixture. The container rotates about a longitudinal axis of the container in an open bucket filled with salt and ice. The salt and ice cools the ice cream mixture as the container rotates in the bucket until the ice cream is frozen.

Conventional churning systems suffer from numerous disadvantages. For example, conventional churning systems may not be safe for children to operate. The container is rotating, often rotated by an electric motor, within the bucket. The clearances between the container and bucket may allow a child's hand to get caught and injured. Another disadvantage of conventional churning systems is that they are often large and bulky, and difficult to operate.

SUMMARY OF THE INVENTION

Accordingly, a need has arisen in the art for an improved churning system. The present invention provides a churning system that substantially eliminates or reduces problems associated with the prior churning systems.

In accordance with one aspect of the present invention, a churning system may comprise a rotating assembly and a bracket. The bracket may be coupled to the vehicle and the rotating assembly to allow the rotating assembly to rotate. The rotating assembly may include an outer container, an inner container inside of the outer container, and a cooling cavity between the inner container and the outer container.

The outer container may include an outer receptacle having an opening, and an outer receptacle lid sized to fit the opening in the outer receptacle. The inner container may include an inner receptacle having an opening, and an inner receptacle lid sized to fit the opening in the inner receptacle. The inner container operates to contain an edible mixture, such as ice cream. The cooling cavity may be formed between the outer container and the inner container, and may contain a cooling media to cool the edible mixture.

In accordance with another aspect of the present invention, a churning system may comprise a rotating assembly and a bracket. The bracket may couple the rotating assembly to the vehicle to allow the rotating assembly to rotate. The rotating assembly may include a canister having an opening, and a canister lid sized to fit the opening in the canister. The canister may have a freezing cavity that may be formed between an outer wall and an inner wall of the canister. The canister may also include a freezing media contained inside the freezing cavity.

Technical advantages of the present invention include providing children a fun and safe system for making their own cold treats, such as ice cream.

Other technical advantages will be readily apparent to one skilled in the art from the following figures, descriptions, and claims.

BRIEF DESCRIPTION OF THE DRAWINGS

For a more complete understanding of the present invention and the advantages thereof, reference is now made to the following brief description, taken in conjunction with the accompanying drawings and detailed description, wherein like reference numerals represent like parts, in which.

DETAILED DESCRIPTION OF THE INVENTION

The preferred embodiments of the present invention and its advantages are best understood by referring now in more detail to FIGS. 1–4 of the drawings, in which like numerals refer to like parts. FIGS. 1–4 illustrate a churning system in accordance with one embodiment of the present invention. As described in more detail below, the churning system may include a bracket and a rotating assembly. The rotating assembly includes the components of the churning system that rotate to mix and cool an edible mixture to produce a cold treat, such as ice cream. The bracket allows the rotating assembly to be mounted to a vehicle, such as a bicycle, and allows cold treats, such as ice cream, to be produced while a person operates the vehicle, such as riding the bicycle. Children and adults alike can enjoy making and eating the cold treats.

Figure 1:
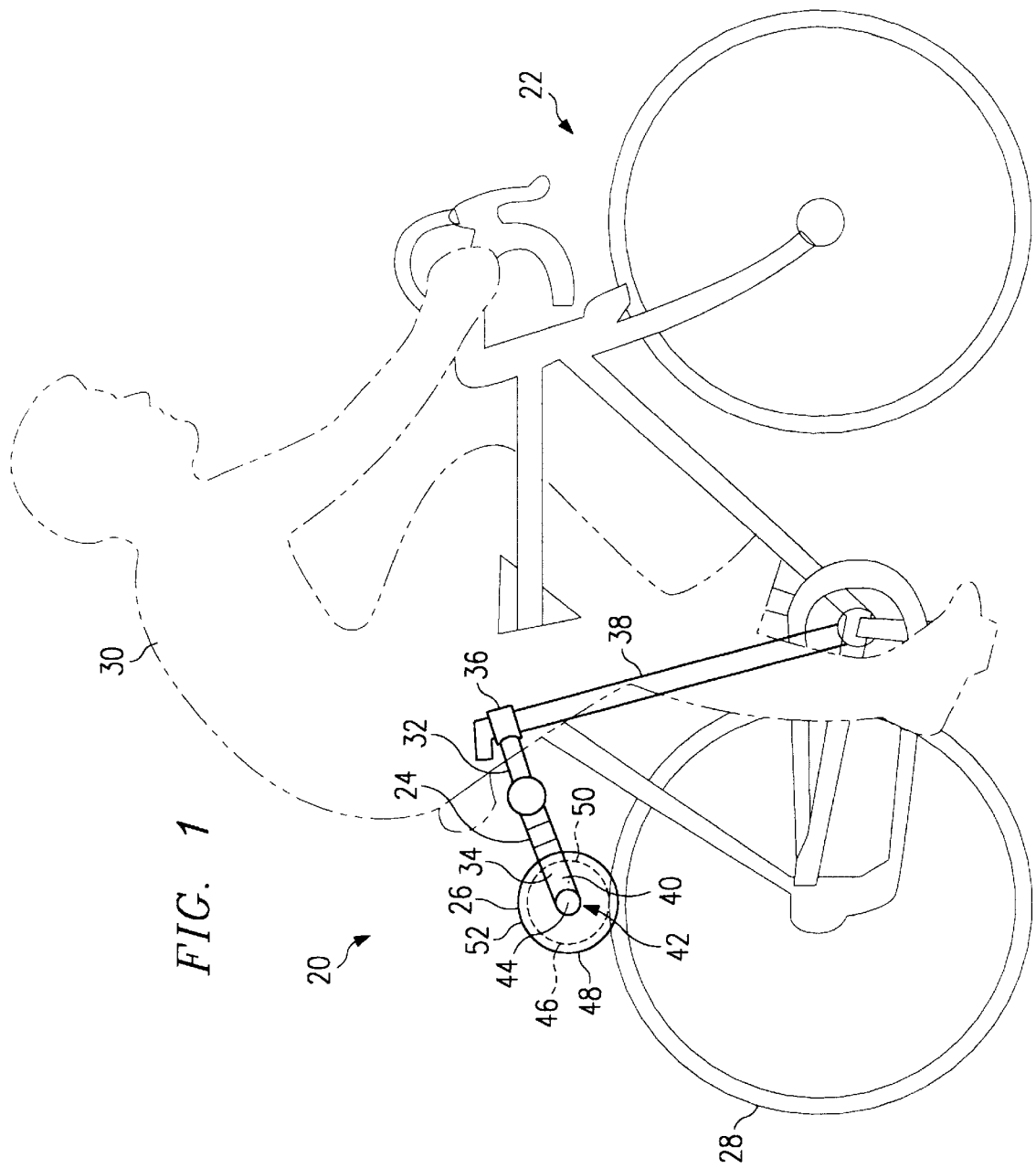
FIG. 1 is a side view illustrating a churning system attached to a bicycle in accordance with one embodiment of the present invention.

FIG. 1 is a side view illustrating a churning system 20. In one embodiment the churning system 20 may be attached to a bicycle 22. It will be understood that the churning system 20 may be otherwise used within the scope of the present invention. For example, the churning system 20 may be attached to a tricycle, a motorcycle, or any other such suitable vehicle.

The churning system 20 may include a bracket 24 and a rotating assembly 26. The bracket 24 may be any device or system that attaches the rotating assembly 26 to the bicycle 22. The bracket 24 may be constructed such that the rotating assembly 26 is horizontally mounted to the bicycle 22 with the rotating assembly 26 contacting a tire 28 of the bicycle 22. Thus, the rotating assembly 26 rotates in response to a person 30 operating the bicycle 22.

The bracket 24 may include a first end 32 and a second end 34. As described in more detail below, the first end 32 may include an attachment system 36 that operates to attach the bracket 24 to the bicycle 22. In one embodiment, the first end 32 of the bracket 24 may be attached to a seat brace 38 as illustrated in FIG. 1. The second end 34 of the bracket 24 may include a fork 40. The fork 40 may be coupled to the rotating assembly 26 by a bearing system 42.

As discussed in more detail below, the bearing system 42 may be any system or device that couples the bracket 24 to the rotating assembly 26 and allows the rotating assembly 26 to rotate in response to the rotation of the tire 28 during operation of the bicycle 22. The bearing system 42 may also allow the rotating assembly 26 to be easily removed from the bracket 24.

The rotating assembly 26 may be any device or system for producing cold treats. In one embodiment and as described in greater detail below, the rotating assembly 26 may be cylindrical and mounted to the bicycle 22 such that a longitudinal axis 44 of the rotational assembly may be parallel to the axis of rotation of the tire 28. The bracket 24 may preferably be coupled to the rotating assembly 26 by the bearing system 42 along the longitudinal axis 44.

The rotating assembly 26 may also include a guide 46 disposed within an outer surface 48 of the rotating assembly 26. The guide 46 may be any device or system that operates to provide friction or stability to the rotating assembly 26 during operation of the churning system 20. The guide 46 typically corresponds to that area of contact with the tire 28. In one embodiment, the guide 46 may include a high friction surface 50. For example, the high friction surface 50 may be formed using an adhesive and a friction material, such as sand. The guide 46 may also include a channel 52 formed within the outer surface 48 of the rotating assembly 26. The channel allows the rotating assembly 26 to maintain alignment on the tire 28 during operation of the churning system 20.

Figure 2:
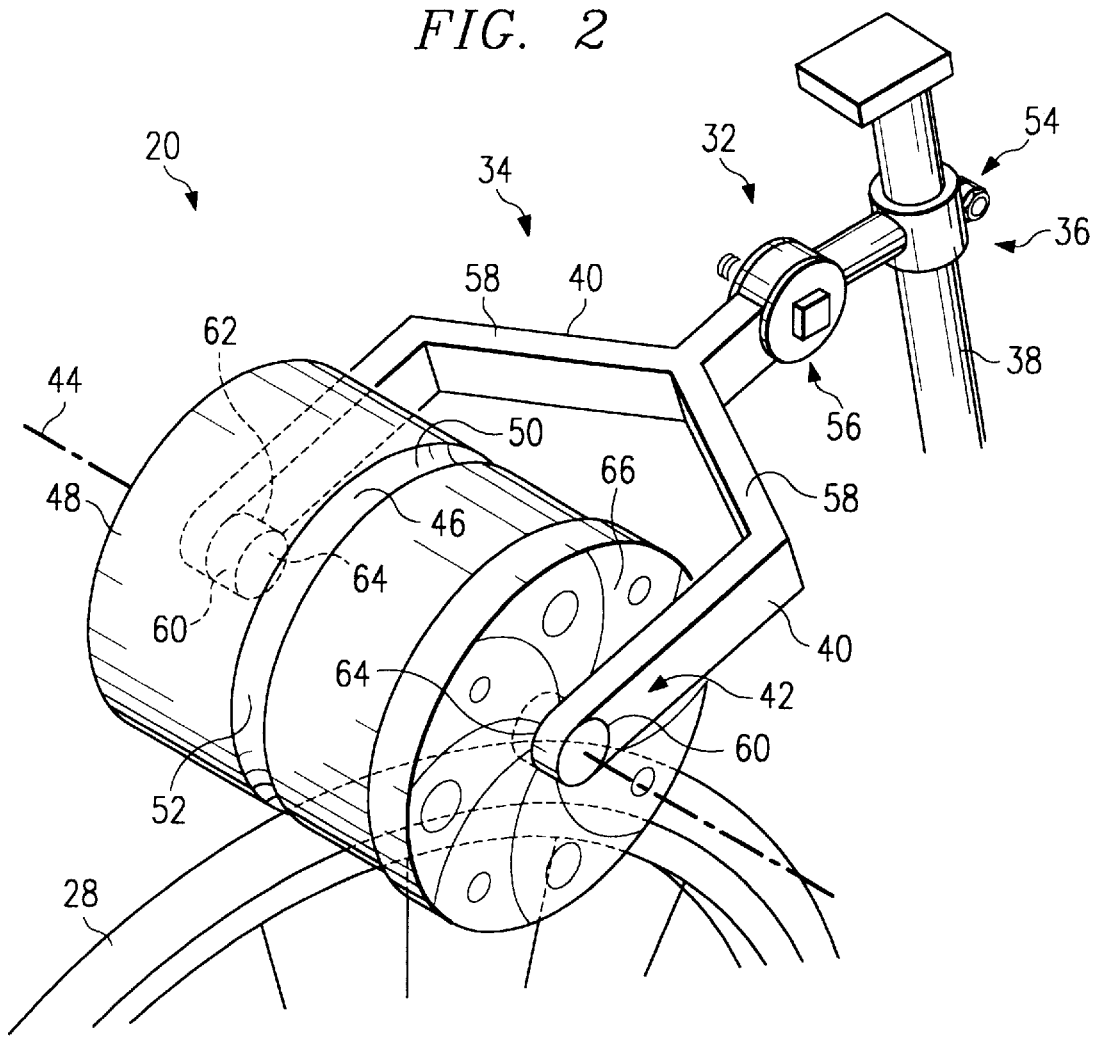
FIG. 2 is a perspective view illustrating the churning system of FIG. 1 in accordance with one embodiment of the present invention.

FIG. 2 is a perspective view illustrating the churning system 20 of FIG. 1. As previously discussed, the first end 32 of the bracket 24 may include the attachment system 36. The attachment system 36 may be any device or system for securably attaching the bracket 24 to the bicycle 22. In one embodiment the attachment system 36 may include a clamp 54 that secures the bracket 24 to the seat brace 38.

The bracket 24 may also include a quick disconnect system 56. The quick disconnect system 56 may be any device or system that allows the rotating assembly 26 and a portion of the bracket 24 to be removed from the bicycle 22. For example, the quick disconnect system 56 may include a pinned coupling as illustrated in FIG. 2.

The fork 40 may form the second end 34 of the bracket 24 may include a pair of prongs 58. The bearing system 42 may include a bearing assembly 60 associated with each prong 58. In one embodiment, the bearing assembly 60 may include a pin 62 and a corresponding recess 64. The pin may be connected to the prong 58 and the recess 64 may be located in the rotating assembly 26. The pin 62 may be movable within the prong 58 to allow the pin 62 to be removed from the recess 64, thus allowing the rotating assembly 26 to be removed from the bracket 24.

The outer surface 48 of the rotating assembly 26 may include a decorative design 66. The decorative design 66 may be any texture, color, or pattern that creates a visual pattern during operation of the churning system 20.

Figure 3:
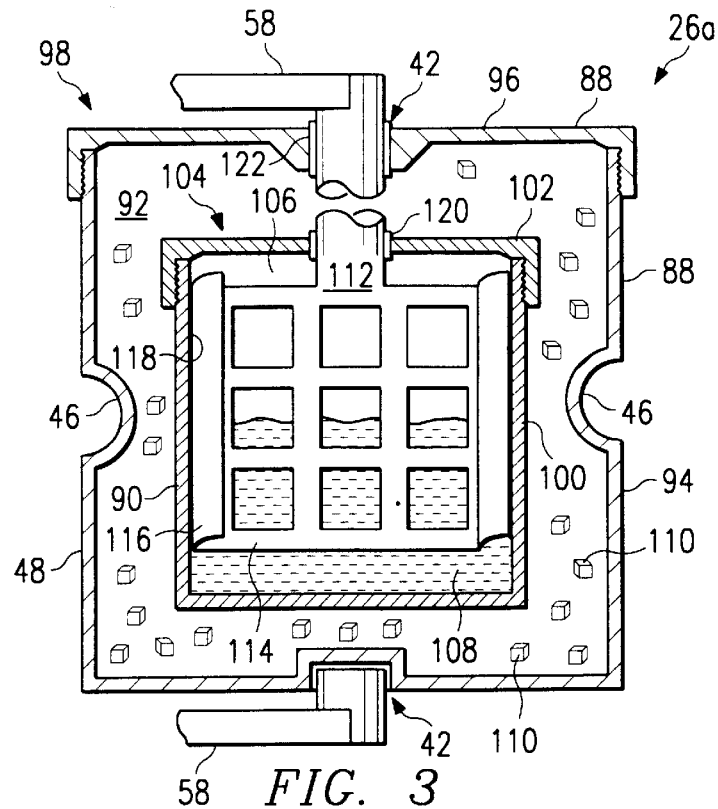
FIG. 3 is a cross-sectional view illustrating a rotating assembly of a churning system in accordance with one embodiment of the present invention.

FIG. 3 is a cross-sectional view illustrating a rotating assembly 26a in accordance with one embodiment of the present invention. In this embodiment, the rotating assembly 26a may include an outer container 88, an inner container 90 inside of the outer container 88, with a cooling cavity 92 formed between the inner container 90 and the outer container 88.

In one embodiment, the outer container 88 may include a cylindrical outer receptacle 94 and an outer receptacle lid 96 sized to fit an opening 98 in the outer receptacle 94. The outer receptacle lid 96 may be secured to the outer receptacle 94 by any number of methods. For example, the outer receptacle lid 96 may be secured to the outer receptacle 94 by threads, press fit, or any other suitable method or system. The outer receptacle 94 and/or the outer receptacle lid 96 may be manufactured from a thermally non-conductive material, or insulator, such that the outer container 88 forms a partial barrier to thermal energy entering the outer container 88 from the environment.

In one embodiment, the inner container 90 may include a cylindrical inner receptacle 100 and an inner receptacle lid 102 sized to fit an opening 104 in the inner receptacle 100. The inner receptacle lid 102 may be secured to the inner receptacle 100 by any number of methods. For example, the inner receptacle lid 102 may be secured to the inner receptacle 100 by threads, press fit, or any other suitable method or system.

The inner receptacle 100 and the inner receptacle lid 102 may define a food cavity 106 that allows an edible mixture 108, such as an ice cream mixture, to be placed into the food cavity 106. The inner receptacle 100 and/or the inner receptacle lid 102 may be formed from a thermally conductive material such that the inner container 90 may conduct heat from the edible mixture 108 in the food cavity 106 to the cooling cavity 92, thereby cooling or freezing the edible mixture 108 to form a cold treat, such as ice cream.

The cooling cavity 92 may contain a cooling media 110 that operates to cool or freeze the edible mixture 108 within the inner container 90. For example, the cooling media 110 may be a mixture of salt and ice.

The rotating assembly 26a may also include a dasher 112 contained within the inner container 90. The dasher 112 may be any device or system that operates to mix the edible mixture 108 contained within the food cavity 106. In one embodiment, the dasher 112 may include a panel 114 having a scraper 116 in contact with a cylindrical surface 118 of the food cavity 106. The combination of the panel 114 and the scraper 116 mixes the edible mixture 108 to prevent the edible mixture 108 from freezing to the inner container 90.

In one embodiment, the dasher 112 may be coupled to the bracket 24 such that the dasher 112 is restricted from rotating with the other components of the rotating assembly 26a. In this embodiment, the inner container may include a seal 120 to prevent communication between the edible mixture 108 and the cooling media 110. Similarly, the outer container may include a seal 122 to prevent leakage of the cooling media 110 from the outer container 88.

Figure 4:
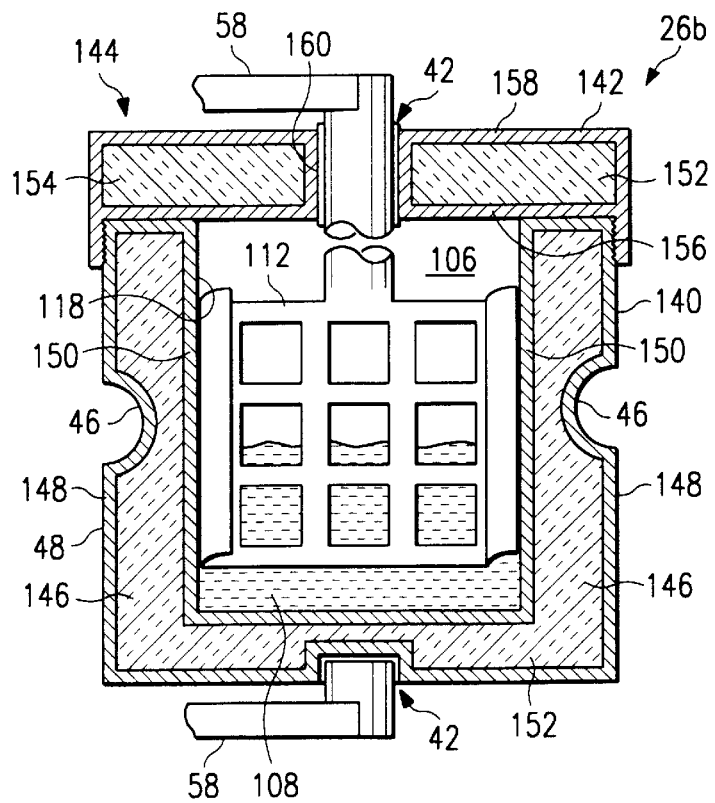
FIG. 4 is a cross-sectional view illustrating a rotating assembly of a churning system in accordance with another embodiment of the present invention.

FIG. 4 is a cross-sectional view illustrating a rotating assembly 26b in accordance with another embodiment of the present invention. In this embodiment, the rotating assembly 26b may include a canister 140 and a canister lid 142 sized to fit an opening 144 in the canister 140. The canister 140 may include a freezing cavity 146 contained between an outer wall 148 and an inner wall 150 of the canister 140.

The freezing cavity 146 may contain a freezing media 152. The freezing media 152 may be any chemical or chemical mixture operable to cool or freeze the edible mixture 108 during operation of the churning system 20. The canister 140 containing the freezing media 152 may be placed into a freezer so that the freezing media 152 in the canister 140 may be frozen prior to use of the churning system 20.

The canister lid 142 may be sized to fit the opening 144 in the canister 140. The canister lid 142 may be secured to the canister 140 by any number of methods. For example, the canister lid 142 may be secured to the canister 140 by threads, press fit, or any other suitable method or system.

The canister lid 142 may also include a freezing cavity 154 between an inner wall 156 and an outer wall 158. The freezing cavity 154 of the canister lid 142 may contain the freezing media 152 as described above. As previously described, the freezing media 152 in the canister lid 142 may be cooled or frozen prior to use in the same manner as described above for the canister 140.

The inner wall 150 of the canister 140 and the inner wall 156 of the canister lid 142 may define, at least in part, the food cavity 106. As previously discussed, the food cavity 106 operates to contain the edible mixture 108 during operation of the churning system 20.

In one embodiment, the outer wall 148 of the canister 140 and the outer wall 158 of the canister lid 142 may be formed from a thermally non-conductive material, or insulator, such that the outer wall 148 of the canister 140 and the outer wall 158 of the canister lid 142 form a partial barrier to thermal energy entering the rotating assembly 26 from the environment.

In contrast, the inner wall 150 of the canister 140 and the inner wall 156 of the canister lid 142 may be formed from a thermally conductive material such that the inner wall 150 and the inner wall 156 may conduct heat from the edible mixture 108 in the food cavity 106 to the freezing media 152, thereby cooling or freezing the edible mixture 108 to form a cold treat.

In one embodiment, the rotating system 26b may include the dasher 112. The dasher 112 operates in the same manner as discussed previously. In this embodiment, the canister lid 142 may include a seal 160 to prevent the edible mixture 108 from leaking from the food cavity 106 during operation of the churning system 20.

In operation, an edible mixture 108 is prepared and poured into the food cavity 106 of the rotating assembly 26. The constituent components of the rotating assembly 26 is assembled and secured to the bracket 24 to form the churning system 20. The churning system 20 is attached to the bicycle 22 with the rotating assembly 26 contacting the tire 28 of the bicycle 22.

The operation of the bicycle 22 rotates the tire 28, thereby rotating the rotating system 26. The rotation of the rotating system 26 allows the cooling media 110 to cool or freeze the edible mixture 108 contained in the food cavity 106 of the rotating assembly 26. The churning system 20 is removed from the bicycle 22 and disassembled to reveal the edible mixture 108 in the food cavity 106. The edible mixture 108 has been cooled or frozen to produce a cold treat, such as ice cream, that can be enjoyed by children and adults alike.

Although the present invention has been described with several embodiments, various changes and modifications may be suggested to one skilled in the art. It is intended that the present invention encompass such changes and modifications as fall within the scope of the present appended claims.

What is claimed is:

1. A churning system for a vehicle for substantially freezing an edible mixture, the churning system comprising:
   a rotating assembly including:
      an outer container having an outer receptacle with an opening and an outer receptacle lid sized to fit the opening in the outer receptacle;
      an inner container disposed within the outer container and operable to contain the edible mixture, the inner container comprising an inner receptacle having an opening and an inner receptacle lid sized to fit the opening in the inner receptacle;
      a cooling cavity disposed between the outer container and the inner container, the cooling cavity operable to contain a cooling media to cool the edible mixture; and
   a bracket coupled to the vehicle and the rotating assembly to allow the rotating assembly to rotate.

2. The churning system of claim 1, wherein the rotating assembly is contacting a tire of the vehicle.

3. The churning system of claim 1, wherein the inner receptacle lid is threadably securable to the inner receptacle.

4. The churning system of claim 1, wherein the outer receptacle lid is threadably securable to the outer receptacle.

5. The churning system of claim 1, further comprising a dasher disposed, at least in part, within the inner container for mixing the edible mixture during operation of the vehicle.

6. The churning system of claim 1, the rotating assembly having an outer surface with a design decoration, the design decoration operable to provide a visual pattern during operation of the churning system.

7. The churning system of claim 1, further comprising a guide disposed on an outer surface of the rotating assembly, the guide for contacting a tire of the vehicle.

8. The churning system of claim 1, wherein the vehicle is a bicycle.

9. A churning system for cooling an edible mixture on a vehicle, the churning system comprising:
   a rotating assembly having:
      a canister with an opening, the canister comprising a freezing cavity disposed, at least in part, between an outer wall and an inner wall, the canister further comprising a freezing media disposed within the freezing cavity;
      a canister lid sized to fit the opening in the canister; and
   a bracket for coupling the rotating assembly to the vehicle to allow the rotating assembly to rotate.

10. The churning system of claim 9, wherein the canister lid is threadably securable to the canister.

11. The churning system of claim 9, wherein a food cavity is defined, at least in part, by the inner wall of the canister and the canister lid, and a dasher is disposed, at least in part, within the food cavity for mixing the edible mixture during operation of the vehicle.

12. The churning system of claim 11, wherein the dasher is operationally coupled to the bracket.

13. The churning system of claim 9, wherein the canister lid includes a freezing cavity disposed between an inner wall and an outer wall of the canister lid, and a freezing media disposed within the freezing cavity of the canister lid.

14. The churning system of claim 9, the rotating assembly comprising an outer surface with a design decoration, the design decoration providing a visual pattern during operation of the churning system.

15. The churning system of claim 9, wherein the vehicle is a bicycle.

16. The churning system of claim 15, wherein the rotating assembly contacts a tire of the bicycle.

17. A churning system for freezing an ice cream mixture on a bicycle, the churning system comprising:
   a rotating assembly having a longitudinal axis and an outer surface, the outer surface having a design decoration to provide a visual pattern during operation of the ice cream maker;
   wherein the rotating assembly comprises a canister and a canister lid;
   wherein the canister comprises a freezing cavity disposed between an outer wall and an inner wall of the canister;
   wherein the canister lid is sized to fit an opening in the canister, the canister lid threadably securable to the canister, and the canister lid includes a freezing cavity disposed between an outer wall and an inner wall of the canister lid;

a freezing media disposed within the freezing cavity of the canister and the canister lid;

a bracket having a first end and a second end;

a bearing system coupling the rotating assembly to the second end of the bracket to allow the rotating assembly to rotate about its longitudinal axis, and the first end of the bracket is coupled to the bicycle;

wherein the bracket secures the rotating assembly in a horizontal position and allows the rotating assembly to contact a tire of the bicycle.

18. The ice cream maker of claim 17, wherein the outer surface of the rotating assembly further comprises a guide.

19. The ice cream maker of claim 17, wherein the first end of the bracket comprises a quick disconnect system.

20. The ice cream maker of claim 19, wherein the first end of the bracket further comprises a clamp.

* * * * *